United States Patent [19]

Nitta et al.

[11] Patent Number: 5,188,774
[45] Date of Patent: Feb. 23, 1993

[54] AROMATIC POLYESTER FILM AND PROCESS FOR PRODUCING THE SAME

[75] Inventors: Shozo Nitta; Hideshi Kurihara, both of Sagamihara; Kazuyuki Sanenobu; Tetsuo Ichihashi, both of Matsuyama; Norio Takagi, Zama, all of Japan

[73] Assignee: Teijin Limited, Osaka, Japan

[21] Appl. No.: 576,492

[22] PCT Filed: Jan. 10, 1990

[86] PCT No.: PCT/JP90/00016

§ 371 Date: Sep. 10, 1990

§ 102(e) Date: Sep. 10, 1990

[87] PCT Pub. No.: WO90/48171

PCT Pub. Date: Jul. 26, 1990

[30] Foreign Application Priority Data

Jan. 10, 1989 [JP] Japan ........................... 1-2030

[51] Int. Cl.$^5$ ............................................... B29C 41/26
[52] U.S. Cl. ......................................... 264/22; 264/211; 264/216; 528/275; 528/276; 528/286; 528/287; 528/293; 528/295; 528/308
[58] Field of Search ..................... 264/22, 211, 211.13, 264/216, 237; 528/275, 276, 286, 287, 293, 295, 308, 480, 502

[56] References Cited

U.S. PATENT DOCUMENTS

| | | |
|---|---|---|
| 3,732,183 | 5/1973 | Popp et al. ........................... 528/287 |
| 4,478,772 | 10/1984 | Takagi et al. ........................... 264/22 |
| 4,604,453 | 8/1986 | Kuze et al. ........................... 528/275 X |
| 4,851,504 | 7/1989 | Suzuki et al. ........................... 528/287 |

FOREIGN PATENT DOCUMENTS

| | | |
|---|---|---|
| 2503847 | 8/1976 | Fed. Rep. of Germany . |
| 2281206 | 3/1976 | France . |
| 37-6142 | 6/1962 | Japan . |
| 47-22334 | 6/1972 | Japan . |
| 53-40231 | 10/1978 | Japan . |
| 56-15730 | 4/1981 | Japan . |
| 59-62626 | 4/1984 | Japan . |
| 59-62627 | 4/1984 | Japan . |
| 60-15115 | 1/1985 | Japan . |
| 61-40538 | 9/1986 | Japan . |
| 62-187724 | 8/1987 | Japan . |
| 62-189133 | 8/1987 | Japan . |
| 62-230835 | 10/1987 | Japan . |
| 63-35328 | 2/1988 | Japan . |
| 1-103623 | 4/1989 | Japan . |
| 1-103650 | 4/1989 | Japan . |
| 1-29500 | 6/1989 | Japan . |
| 1-192823 | 8/1989 | Japan . |
| 1-197523 | 8/1989 | Japan . |

*Primary Examiner*—Leo B. Tentoni
*Attorney, Agent, or Firm*—Wenderoth, Lind & Ponack

[57] ABSTRACT

The present invention enables production of an aromatic polyester film having no surface defect and a uniform thickness, while achieving a high productivity, by allowing a molten film of an aromatic polyester to adhere onto a rotating cooling drum to cool the molten film. The molten film has electrical properties characterized by a relatively small AC volume resistivity and has excellent basic properties necessary for adhering onto the rotating cooling drum.

21 Claims, 1 Drawing Sheet

AROMATIC POLYESTER FILM AND PROCESS FOR PRODUCING THE SAME

TECHNICAL FIELD

The present invention relates to an aromatic polyester film and a process for producing the film. More particularly, the present invention relates to a process for producing an aromatic polyester film having no surface defect and a uniform thickness, at a high productivity, by allowing a molten film of an aromatic polyester to adhere onto a rotating cooling drum to cool the molten film, as well as to such an aromatic polyester film.

BACKGROUND ART

Thermoplastic polyesters typified by poly(ethylene terephthalate) have excellent physical and chemical properties and accordingly are in wide use in film fields such as magnetic tape application, electrical insulation application, condenser application, photography application, packaging application and the like.

Polyester films are usually produced by extruding a film-like melt from an extruder die, rapidly cooling the melt on the surface of a rotating cooling drum, then biaxially stretching the resulting film to lengthwise and crosswise directions. In this case, in order to obtain a film having no surface defect and a thickness of high uniformity, it is necessary to increase the adhesion between the film-like melt and the surface of the rotating cooling drum. As the method for increasing the adhesion, there is known a method in which a wire-shaped electrode is provided between the extruder die and the surface of the rotating cooling drum to deposit electrostatic charges on the surface of the film-like melt and thereby the film-like melt is allowed to adhere to the surface of the cooling drum and is cooled rapidly under this condition (the method is hereinafter referred to as electrostatic casting method) (reference is made to Japanese Patent Publication No. 6142/1962).

Even in this electrostatic casting method, however, as the circumferential speed of the rotating cooling drum is made faster to increase the productivity of film, the strength of the adhesion of the film-like melt onto the surface of the cooling drum is reduced, inviting the formation of pinner bubbles on the film surface and reducing the uniformity of film thickness.

In film formation, particularly the formation of a monoaxially or biaxially stretched film, higher productivity and resultant reduced production cost is an important task, together with higher film quality. To achieve it, employing a faster circumferential speed of the rotating cooling drum and thereby increasing a speed of film formation is most effective. In the electrostatic casting method, when the circumferential speed of the rotating cooling drum is made faster, the amount of electrostatic charges applied per unit area of the surface of film-like melt becomes smaller, and thereby the adhesion between film-like melt and drum surface is reduced, which invites formation of pinner bubbles on film surface and reduction in uniformity of film thickness. Hence, in order to increase the adhesion, there can be taken a means for increasing the amount of electrostatic charges deposited on the film-like melt surface by increasing the voltage applied to the above-mentioned electrode. Application of too high a voltage to the electrode gives rise, in some cases, to arcing between the electrode and the rotating cooling drum, breakage of the film-like melt on the cooling drum surface and damaging of the cooling drum surface. Thus, increase of the voltage applied to the electrode to higher than a certain level is virtually impossible and the conventional electrostatic casting method has a limitation for obtaining a uniform film by increasing the speed of film formation.

To produce a polyester film having a uniform thickness and no surface defect at a high efficiency by overcoming such a limitation of the electrostatic casting method and using a higher film formation speed, Japanese Patent Publication No. 40231/1978 proposes incorporation into a polymer an alkali metal, an alkaline earth metal or a compound thereof in an amount of 0.005–1% by weight, preferably 0.07–0.3% by weight, to allow the resulting molten polymer to have a resistivity of $2\times10^{7}$–$5\times10^{8}$ Ω·cm to increase the above-mentioned adhesion. The document shows, as specific examples, addition of 0.15% by weight of lithium acetate to allow the molten polymer to have a resistivity of $0.5\times10^{8}$ Ω·cm and addition of 0.09% by weight of strontium acetate to allow the molten polymer to have a resistivity of $2\times10^{8}$ Ω·cm.

In the direct polymerization process for obtaining a polyester, when an alkali metal compound or an alkaline earth metal compound is added, the amount of diethylene glycol (DEG) formed as a by-product is large and the obtained polyester has a lower melting point, which invites various problems, for example, easy sticking of film onto casting drum and increased breakage of film during stretching. Therefore, as a process for producing a polyester wherein the amount of DEG formed as a by-product is small and the electrostatic castability is improved, Japanese Patent Publication No. 15730/1981 proposes adding, after the substantial completion of esterification reaction, a metal compound selected from Zn, Mg and Mn compounds and a phosphorus compound so as to satisfy the following formulas $$20 \leqq M \leqq 1{,}000$$

$$0.8 \leqq M/P \leqq 5$$

[M indicates the total metal atom amount (ppm) of the metal compound relative to the polyester, and M/P indicates a molar ratio of the total metal compound and phosphorus] and then effecting polycondensation.

As a process for alleviating the above problems of the direct polymerization process, Japanese Patent Application Laid-Open No. 62627/1984 proposes, in producing a polyester whose main repeating unit consists of ethylene terephthalate, according to the direct polymerization process, addition, before the start of esterification, of a Mg compound in an amount of 30–400 ppm (as Mg atom) relative to the polyester and addition, between the timing at which the esterification degree has reached 91% or more and the timing at which the initial condensation reaction has been completed, of a P compound and an alkali metal (Na, K) compound so as to satisfy the following formulas $$1.2 \leqq Mg/P \leqq 2.0$$

$$3.0 \leqq M \leqq 50$$

wherein Mg/P indicates an atomic ratio of Mg atom and P atom, and M indicates the amount of the alkali metal compound added, expressed in terms of metal atom (ppm) relative to the polyester.

With a polyester material obtained according to a conventionally known process, it is difficult to produce a high quality polyester film satisfying the market needs, at a high casting speed. When using a Ca compound, in particular, reduction in resistivity always gives rise to precipitation of large particles, making it difficult to completely prevent reduction in transparency.

As a process for alleviating the above problem, Japanese Patent Application Laid-Open No. 62626/1984 proposes addition, at the timing at which the esterification degree in the direct polymerization process has reached 91% or more, of a P compound, a Ca compound and an alkali metal compound selected from Na compounds and K compounds, in this order and so as to satisfy the following formulas $$50 \leq Ca \leq 400$$

$$1.2 \leq Ca/P \leq 3.0$$

$$3.0 \leq M \leq 20$$

wherein Ca indicates the amount of the Ca compound added, expressed in terms of Ca atom (ppm) relative to the polyester, Ca/P indicates an atomic ratio of Ca atom and P atom, and M indicates the amount of the alkali metal compound added, expressed in terms of metal atom (ppm) relative to the polyester.

To reduce the resistivity of a molten polyester, it is necessary to add thereto large amounts of an alkali metal compound and an alkaline earth metal compound. The addition, however, invites precipitation of particles in the polyester and the particles become large. These large particles cause appearance of pin holes in formed film, arching during film formation, and striking deterioration in color of polyester film (this gives a polyester film of very yellowish color), all of which are undesirable. Hence, Japanese Patent Publication No. 40538/1986 proposes addition to a polyester, of 0.01-2% by weight of a fine inorganic powder and 0.0001-0.0025% by weight (as metal) of an alkali metal compound soluble in ethylene glycol.

All of the above proposals are intended to increase the amount of electrostatic charges deposited on the surface of a film-like polyester melt by reducing the resistivity of a molten polyester. However, increasing electrostatic adhesion by reducing resistivity has a limitation.

Japanese Patent Application Laid-Open No. 187724/1987 and Japanese Patent Application Laid-Open No. 189133/1987 give the following description. Maximum casting speed increases largely with decrease in resistivity until the resistivity decreases down to about $0.2 \times 10^8$ $\Omega$·cm; however, in the range of maximum casting speed of 50 m/min. or more and in the range of resistivity of $0.5 \times 10^8$ $\Omega$·cm or less, the difference of resistivities at a maximum casting speed of 70 m/min, and at a maximum casting speed of 80 m/min. is only $0.01 \times 10^8$ $\Omega$·cm and the correlation between maximum casting speed and resistivity becomes very poor. The above two documents (Japanese Patent Application Laid-Open No. 187724/1987 and Japanese Patent Application Laid-Open No. 189133/1987) propose use of a molten polyester having an initially accumulated electric charges amount of 2.9 $\mu$m/mm$^2$ or more and, as a means of increasing the initially accumulated electric charges, addition of a Mg compound and a P compound so as to satisfy the following formulas $$30 \leq Mg \leq 400$$

$$0.8 \leq Mg/P \leq 3$$

Mg indicates the content of the Mg compound, expressed in terms of Mg atom (ppm) relative to the polyester, and Mg/P indicates an atomic ratio of Mg atom and P atom), or addition of said compounds and at least one of Co, Na, K and Zr compounds in combination in particular proportions.

In these cases, also, there are used, as mentioned above, a Mg compound, a P compound, and Na, K, Co or Zr compound(s) in order to increase the initially accumulated electric charges amount; therefore, it is difficult to prevent increase in large particles, deterioration in polymer color, etc. caused by increase in amounts of said compounds.

Meanwhile, Japanese Patent Publication No. 22334/1972 proposes a process for producing a polyester having improved dyeability to basic dyes, by adding to a polyester a phosphonium sulfonate represented by the following formula

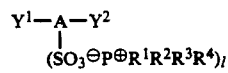

(A is an aliphatic group or an aromatic group; $Y^1$ is a carboxylic acid ester-forming group; $Y^2$ is the same group as $Y_1$, or a hydrogen or halogen atom; $R^1$, $R^2$, $R^3$ and $R^4$ are a group selected from the group consisting of hydrogen atom, alkyl group, aryl group and hydroxyalkyl group; and l is a natural number) in an amount of 10 equivalent % or less based on the repeating unit of the polyester.

U.S. Pat. No. 3,732,183 discloses a filament-forming aromatic polyester dyeable with cationic dyes, containing a sulfonate group represented by the following formula

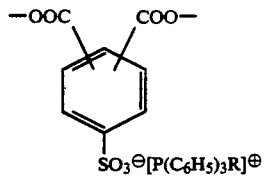

or

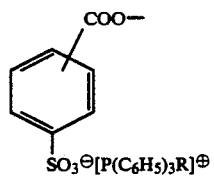

[R is an alkyl group, for example, CH$_3$, C$_2$H$_5$, n—C$_3$H$_7$, n—C$_4$H$_9$, 3-sodium(sulfopropyl) group and 4-sodium(-sulfobutyl) group] in an amount of 0.5–5 mol % based on the constituent unit of the polyester.

Japanese Patent Publication No. 29500/1989 proposes, as an antistatic agent for polymeric material, a compound represented by the following formula

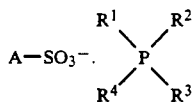

wherein A is an alkyl or alkenyl group of 4–18 carbon atoms, a phenyl group, a $C_{1-18}$ alkyl-substituted phenyl group, a naphthyl group or a $C_{1-18}$ alkyl-substituted naphthyl group; and $R^1$, $R^2$, $R^3$ and $R^4$ are the same or different and a hydrocarbon group of 1–18 carbon atoms or a substituted hydrocarbon group of 1–18 carbon atoms. The above document discloses, as the polymeric material, a poly(ethylene terephthalate) and recommends 0.1–10% by weight as the amount of antistatic agent added.

The following laid-open publications which were laid-open to public later than the priority date of the present application, also discloses cationic dyeable polyester fibers using compounds similar to the phosphonium sulfonates disclosed in Japanese Patent Publication No. 22334/1972, U.S. Pat. No. 3,732,183 and Japanese Patent Publication No. 29500/1989.

European Patent Application Laid-Open No. 0280026 discloses an aromatic polyester fiber containing 0.1–10 mol % of a phosphonium sulfonate represented by the following formula

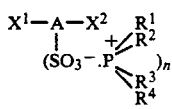

wherein A is an aromatic or aliphatic group; $X^1$ is a hydrogen atom or an ester-forming group; $X^2$ is an ester-forming group which is the same as or different from the ester-forming group of $X^1$; $R^1$, $R^2$, $R^3$ and $R^4$ are independently an alkyl or aryl group; and n is an integer of 1 or more.

Japanese Patent Application Laid-Open No. 103650/1989 discloses a process for producing a cationic dye-dyeable polyester composition showing excellent heat resistance during melt spinning, by incorporating 0.002–2 mol % of an alkali metal or alkaline earth metal salt of an organic carboxylic acid into a polyester modified with 0.05–20 mol % of the same phosphonium sulfonate as the general formula mentioned in the above European Patent Application Laid-Open No. 0280026.

Japanese Patent Application Laid-Open No. 103623/1989 discloses a process for producing a cationic dyeable polyester showing excellent heat resistance during melt spinning, by incorporating, in place of the metal salt of an organic carboxylic acid used in the above Japanese Patent Application Laid-Open No. 103650/1989, 0.1–50 mol % of an aromatic dicarboxylic acid represented by the following formula

HOOC—B—COOH wherein B is

 , 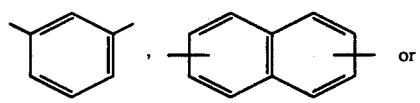 or

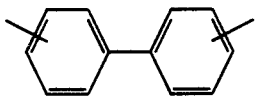

Japanese Patent Application Laid-Open No. 192823/1989 discloses a polyester composition containing 0.01–20 mol % of the same phosphonium sulfonate as the general formula disclosed in the above Japanese Patent Application Laid-Open No. 103650/1989, 0.05–10% by weight of a metal sulfonate represented by the following general formula

(R is an alkyl group of 6 or more carbon atoms, an aryl group or an aralkyl group; M is an alkali metal or an alkaline earth metal; and n is 1 or 2) and 0.05–10% by weight of a poly(oxyalkylene glycol) and/or its derivative. According to the description of the document, this polyester composition prevents generation of static electricity during melt molding and has excellent moldability.

Lastly, Japanese Patent Application Laid-Open No. 197523/1989 proposes a process for producing a modified polyester of excellent moldability and color, containing 0.005–0.495 mol % of the same phosphonium sulfonate as the general formula disclosed in the above Japanese Patent Application Laid-Open No. 103650/1989 and 0.005–0.495 mol % of a metal sulfonate represented by the following formula

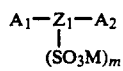

($Z_1$ is an aromatic or aliphatic group; $A_1$ is an ester-forming functional group; $A_2$ is a hydrogen atom or an ester-forming functional group which is the same as or different from the ester-forming functional group of $A_1$; M is a metal atom; and m is a positive integer) so that the total of the two sulfonates become 0.01–0.5 mol %.

In recent years, in magnetic recording media which are the main usage of biaxially stretched polyester film, there are required very high recording density and higher quality video image. Accordingly, said film is required to have excellent smoothness. Large particles present in film which cause, for example, drop-out, reduce film quality significantly. Further, according to the research by the present inventor, a film of a polymer containing large amounts of an alkali metal compound and an alkaline earth metal compound comes to possess therein a large number of black foreign matters, and these black foreign matters significantly reduce the quality of the film.

SUMMARY OF INVENTION

An object of the present invention is to provide an aromatic polyester film and a process for producing the film.

Another object of the present invention is to provide a process for producing an aromatic polyester film having no surface defect and a uniform thickness, while achieving a high productivity, by allowing a molten film of an aromatic polyester to adhere onto a rotating cooling drum to cool the molten film, as well as said film.

Still other objects and advantages of the present invention will become apparent from the following description.

According to the present invention, the above objects and advantages of the present invention are firstly achieved by a process for producing a film of an aromatic polyester by extruding a molten film of a thermoplastic aromatic polyester onto a rotating cooling drum and allowing said film to adhere onto said rotating cooling drum to cool the molten film, which process is characterized in that there is used, as said aromatic polyester, an aromatic polyester which contains in the polymer chain 0.1-45 mmol %, based on the bifunctional carboxylic acid component, of a quaternary phosphonium sulfonate having ester-forming functional group(s) and which has an AC volume resistivity (F/D) of $6.5 \times 10^8$ Ω·cm or less as a molten film, and electric charges are applied onto the surface of the molten film of the aromatic polyester in a non-contact state in the vicinity of the rotating cooling drum right before the molten film reaches the surface of the drum.

DETAILED DESCRIPTION OF THE INVENTION

Figure 1:
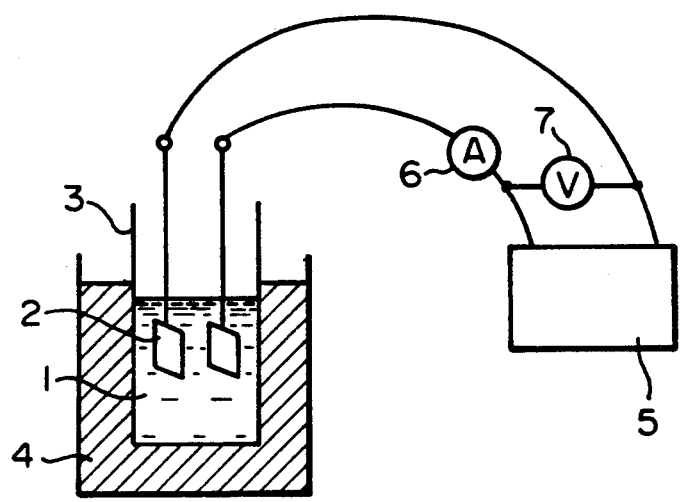
FIG. 1 shows an apparatus for measuring the AC volume resistivity of a polymer.

The aromatic polyester aimed at by the present invention contains in the polymer chain, as a comonomer, 0.1-45 mmol %, based on the bifunctional carboxylic acid component constituting the aromatic polyester, of a quaternary phosphonium sulfonate having ester-forming functional group(s).

As the quaternary phosphonium sulfonate having ester-forming functional group(s), there are preferably used, for example, compounds represented by the following formula

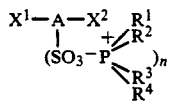

wherein A is an aliphatic or aromatic group of 2-18 carbon atoms having a valency of n+2; $X^1$ and $x^2$ are the same or different and each a hydrogen atom or an ester-forming functional group; n is 1 or 2; $R^1$, $R^2$, $R^3$ and $R^4$ are the same or different and each an alkyl group of 1-8 carbon atoms, a benzyl group or an aryl group of 6-12 carbon atoms; however, $X_1$ and $X_2$ are not hydrogen simultaneously.

In the above formula, A is an aliphatic or aromatic group of 2-18 carbon atoms having a valency of n+2, for example, 3 (n=1) or 4 (n=2).

The aliphatic group is preferably a straight chain or branched chain saturated or unsaturated hydrocarbon group of, for example, 2-10 carbon atoms.

The aromatic group is preferably an aromatic group of 6-18 carbon atoms and more preferably a benzene skeleton, a naphthalene skeleton or a biphenyl skeleton each having a valency of, for example 3 or 4. The aromatic group may be substituted not only with $X_1$, $X_2$ and a quaternary phosphonium sulfonate but also with, for example, an alkyl group of 1-12 carbon atoms.

$X_1$ and $X_2$ can be the same or different and are each hydrogen or an ester-forming functional group. When $X_1$ and $X_2$ are hydrogen simultaneously, the polyester chain contains no copolymerizable group. $X_1$ and $X_2$ are not a hydrogen atom simultaneously, and at least either of them must be an ester-forming functional group.

As the ester-forming functional group, there can be mentioned, for example,

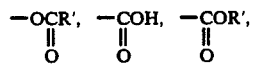

$-C_lH_{2l}OH$, $-(OC_pH_{2p})_qOH$ and $-C-(OC_pH_{2p})_qOH$.
In these groups, R' is a lower alkyl group of 1- carbon atoms or a phenyl group; l is an integer of 2-10; p is an integer of 2, 3 or 4, and q is an integer of 1 or more, for example, an integer of 1-100.

The lower alkyl group of R' may be any of straight chain and branched chain; and there can be preferably mentioned, for example, methyl, ethyl, n-propyl, iso-propyl, n-butyl and sec-butyl.

n is an integer of 1 or 2.

The $R_1$, $R_2$, $R_3$ and $R_4$ constituting the phosphonium sulfonate portion are the same or different and each an alkyl group of 1-18 carbon atoms, a benzyl group or an aryl group of 6-12 carbon atoms.

The alkyl group of 1-18 carbon atoms may be any of straight chain and branched chain. There can be mentioned, for example, methyl, ethyl, propyl, butyl, dodecyl and stearyl.

As the aryl group of 6-12 carbon atoms, there can be preferably mentioned, for example, phenyl, naphthyl and biphenyl. The phenyl portion of the aryl group or the benzyl group may be substituted with, for example, halogen atoms, nitro groups or lower alkyl groups of 1-4 carbon atoms.

As preferable specific examples of the above quaternary phosphonium sulfonate, there can be mentioned tetrabutylphosphonium 3,5-dicarboxybenzenesulfonate; ethyltributylphosphonium 3,5-dicarboxybenzenesulfonate; benzyltributylphosphonium 3,5-dicarboxybenzenesulfonate; phenyltributylphosphonium 3,5-dicarboxybenzenesulfonate; tetraphenylphosphonium 3,5-dicarboxybenzenesulfonate; ethyltriphenylphosphonium 3,5-dicarboxybenzenesulfonate; butyltriphenylphosphonium 3,5-dicarboxybenzenesulfonate; benzyltriphenylphosphonium 3,5-dicarboxybenzenesulfonate; tetrabutylphosphonium 3,5-dicarbomethoxybenzenesulfonate; ethyltributylphosphonium 3,5-dicarbomethoxybenzenesulfonate; benzyltributylphosphonium 3,5-dicarbomethoxybenzenesulfonate; phenyltributylphosphonium 3,5-dicarbomethoxybenzenesulfonate; tetraphenylphosphonium 3,5-dicarbomethoxybenzenesulfonate; ethyltriphenylphosphonium 3,5-dicarbomethoxybenzenesulfonate; butyltriphenylphosphonium 3,5-dicarbomethoxybenzenesulfonate; benzyltriphenylphosphonium 3,5-dicarbomethoxybenzenesulfonate; tetrabutylphosphonium 3-carboxybenzenesulfonate; tetraphenylphosphonium 3-carboxybenzenesulfonate; tetrabutylphosphonium 3-carbomethoxybenzenesulfonate; tetraphenylphosphonium 3-carbomethoxybenzenesulfonate; tetrabutylphosphonium 3,5-di(β-hydroxyethoxycarbonyl)benzenesulfonate; tetraphenylphosphonium 3,5-di(β-hydroxyethoxycarbonyl)benzenesulfonate; tetrabutylphosphonium 3-(β-hydroxyethoxycarbonyl)benzenesulfonate; tetraphenylphosphonium 3-(β-hydroxyethoxycarbonyl)benzenesulfonate; tetrabutylphosphonium 4-hydroxyethoxybenzenesulfonate; bisphenol A-3,3'-di(tetrabutylphosphonium sulfonate); tetrabutylphosphonium 2,6-dicarboxynaphthalene-4-sulfonate; and α-tetrabutylphosphonium sulfosuccinate. These quaterary phoshonium sulfonates may be used alone or in combination of two or more.

These quaternary phosphonium sulfonates can generally be produced easily by a per se known reaction between a corresponding sulfonic acid and a phosphine or by a per se known reaction between a metal salt of a corresponding sulfonic acid and a quaternary phosphonium halide.

As mentioned above, the aromatic polyester aimed at by the present invention contains a quaternary phoshonium sulfonate as mentioned above in a small amount of only 0.1–45 mmol %, preferably 0.2–20 mmol %, based on the bifunctional carboxylic acid component constituting the aromatic polyeser. This indicates that in the aromatic polyester aimed at by the present invention, unlike in the case of, for example, a modified polyester containing a quaternary phosphonium sulfonate in such a sufficient amount that the sulfonate becomes a dyeing site for cationic dye, reduction in physical properties, for example, reduction in softening point, etc. caused by inclusion of quaternary phosphonium sulfonate is small and substantially negligible and that the aromatic polyester of the present invention shows physical properties almost comparable to those of an aromatic polyester containing no quaternary phosphonium sulfonate.

The aromatic polyester aimed at by the present invention is composed of an aromatic dicarboxylic acid as a main dicarboxylic acid component and an alkylene glycol of 2–10 carbon atoms as a main diol component. As the aromatic polyester, particularly preferable are, for example, poly(ethylene terephthalate), poly(ethylene-2,6-nahthalate), a copolyester having ethylene terephthalate as a main repeating unit, and a copolyester having ethylene-2,6-naphthalate as a main repeating unit. As the comonomer of the copolyester, there can be shown, for example, aromatic dicarboxylic acids such as isophthalic acid and the like, and aliphatic dicarboxylic acids such as adipic acid and the like; oxycarboxylic acids such as oxybenzoic acid and the like; aliphatic dihydroxy compound such as trimethylene glycol, tetramethylene glycol, 1,4-cyclohexanedimethanol and the like; and poly(oxyalkylene glycol)s such as poly(ethylene glycol), poly(butylene glycol) and the like. Further, there can be used a polycarboxylic acid (e.g. trimellitic acid, pyromellitic acid) and a polyol (e.g. glycerine, trimethylolpropane, pentaerythritol) as long as the resulting aromatic polyester is substantially linear. Into the thermoplastic aromatic polyester may be incorporated additives such as stabilizer, coloring agent and the like, and further a lubricant such as inorganic fine particles, organic fine particles and the like to increase the lubricity of the polyester.

Such a thermoplastic polyester can be produced by a known process. For convenience, a case of poly(ethylene terephthalate) is explained. It is usually produced by a first-stage reaction wherein a glycol ester of terephthalic acid and/or its low polymer is formed, for example, by subjecting terephthalic acid and ethylene glycol directly to an esterification reaction, or subjecting a lower alkyl ester of terephthalic acid (e.g. dimethyl terephthalate) and ethylene glycol to an ester exchange reaction, or subjecting terephthalic acid and ethylene oxide to an addition reaction, and by a second-stage reaction wherein the product of the first-stage reaction is polycondensed to a desired polymerization degree with heating under reduced pressure. In this case, additives such as catalyst can be used as necessary.

To copolymerize the quaternary phosphonium sulfonate with the aromatic polyester, the quaternary phosphonium sulfonate can be added to the reaction system at any timing before the above synthesis of aromatic polyester is completed, for example, at any timing before the above first-stage reaction is over. In an alternative method, there is prepared an aromatic polyester in which a relative large amount of a quaternary phosphonium sulfonate has been copolymerized, then this aromatic polyester is mixed with an aromatic polyester in which no quaternary phosphonium sulfonate or a relatively small amount of a quaternary phosphonium sulfonate has been copolymerized, so that the proportion of the quaternary phosphonium sulfonate in the resulting mixture becomes a desired level specified by the present invention.

The aromatic polyester aimed at by the present invention contains, as mentioned above, a quaternary phosphonium sulfonate component as a comonomer in a proportion of 0.1–45 mmol % and has an AC volume resistivity (F/D) of $6.5 \times 10^8$ Ω·cm less molten film.

The research by the present inventor revealed that the AC volume resistivity of molten film of aromatic polyester has a closer relation with the electric charges amount appliable onto the surface of the molten film than the DC volume resistivity of the molten film has and that the molten film of an aromatic polyester having an AC volume resistivity (F/D) of $6.5 \times 10^8$ Ω·cm or less as a molten film can be endowed with an electric charges amount sufficient for the molten film to adhere even onto a cooling drum which is rotating at a relatively fast speed.

The aromatic polyester aimed at by the present invention has an AC volume resistivity (F/D) of preferably $3.2 \times 10^8$ to $5.6 \times 10^8$ Ω·cm. Also, the aromatic polyester aimed at by the present invention preferably has an intrinsic viscosity of 0.45–0.75.

The process of the present invention is effected by extruding a melt of an aromatic polyester as mentioned above through a slit onto a rotating cooling drum in a thickness of, for example, 10–1,000 μm and then allowing the film to adhere onto the cooling drum uniformly to cool the film on the cooling drum. The molten film extruded onto the rotating cooling drum is forcibly endowed with electric charges in a non-contact state from an electrode provided at a space apart from the film surface by, for example, 3–10 mm, in the vicinity of the drum right before the molten film reaches the drum surface. As mentioned above, the aromatic polyester aimed at by the present invention contains 0.1–45 mmol % of a quaternary phosphonium sulfonate and has an AC volume resistivity of $6.5 \times 10^8$ Ω·cm or less as a molten film, and by being endowed with electric charges as above, the aromatic polyester adheres uniformly even to a cooling drum which is rotating relatively fast. The apparatus for imparting electric charges from an electrode and the apparatus of cooling drum used in combination therewith are disclosed in, for example, the above-mentioned Japanese Patent Publication No. 6142/1962.

The rotational speed of the cooling drum can be made as large as, for example, at least 50 m/min, in terms of circumferential speed. A preferable circumferential speed can be 60–200 m/min.

The cooling surface of the cooling drum which receives the molten film of the aromatic polyester, can be, for example, a mirror surface or, as in the cooling drum disclosed in U.S. Pat. No. 4,478,772, a surface having a large number of channel-like microcracks.

When there is used a cooling drum whose cooling surface is a mirror surface, the circumferential speed of the cooling drum is advantageously 60–150 m/min. When there is used a cooling drum whose cooling surface is a surface having a large number of channel-like microcracks, the circumferential speed of the cooling drum is advantageously 80–200 m/min.

It is possible to form, on the cooling surface of the cooling drum, a liquid film composed mainly of water between the cooling surface and the molten film of the aromatic polyester. The method for forming a liquid film is known per se and disclosed in, for example, French Patent No. 2,049,046 and Japanese Patent Application Laid-Open No. 99160/1974.

As mentioned above, the present invention can be applied also to other improved methods employing a principle of electrostatic adhesion, whereby an effect of enhancing the circumferential speed of rotating drum is obtained.

The cooled and solidified film obtained from the rotating cooling drum according to the present process is, for example, immediately stretched monoaxially or biaxially, or wound up and then stretched biaxially, and is used in various fields.

The research by the present inventor revealed that the objects of the present invention can also be achieved by using, in place of the above-mentioned aromatic polyester, an aromatic polyester which contains in the polymer chain 0.1–45 mmol %, based on the bifunctional carboxylic acid component, of a quaternary phosphonium sulfonate having ester-forming functional group(s) and further contains 0.1–20 mmol %, based on the bifunctional carboxylic acid component, of an alkali metal or alkaline earth metal compound and which has an AC volume resistivity (F/D) of $6.4 \times 10^8$ Ω·cm or less as a molten film.

Therefore, according to the present invention, there is secondly provided a process for producing a film of an aromatic polyester by extruding a molten film of a thermoplastic aromatic polyester onto a rotating cooling drum and allowing said film to adhere onto said rotating drum to cool the molten film, which process is characterized in that there is used, as said aromatic polyester, an aromatic polyester which contains the above-mentioned quaternary phosphonium sulfonate and an alkali metal or alkaline earth metal compound and which has an AC volume resistivity of $6.4 \times 10^8$ Ω·cm or less as a molten film, and electric charges are applied onto the surface of the molten film of the aromatic polyester in a non-contact state in the vicinity of the rotating cooling drum before the molten film reaches the surface of the drum.

As the alkali metal or alkaline earth metal, there can be mentioned, for example, lithium, sodium, potassium, magnesium, calcium, cesium, strontium, barium, rubidium and beryllium. As their compounds, there can be mentioned, for example, their oxides, chlorides, hydroxides, sulfides, sulfates, carbonates, phosphates and carboxylates. Specifically, there can be mentioned, for example, magnesium oxide, calcium oxide, sodium chloride, potassium chloride, rubidium chloride, cesium chloride, calcium chloride, strontium chloride, magnesium chloride, calcium hydride, strontium hydride, magnesium hydride, lithium hydroxide, sodium hydroxide, potassium hydroxide, rubidium hydroxide, cesium hydroxide, beryllium hydroxide, magnesium hydroxide, calcium hydroxide, strontium hydroxide, barium hydroxide, sodium sulfate, potassium sulfate, magnesium sulfate, calcium sulfate, barium sulfate, sodium carbonate, potassium carbonate, beryllium carbonate, magnesium carbonate, calcium carbonate, strontium carbonate, barium carbonate, sodium phosphate, potassium phosphate, magnesium phosphate, calcium phosphate, lithium acetate, sodium acetate, potassium acetate, rubidium acetate, cesium acetate, beryllium acetate, magnesium acetate, calcium acetate, strontium acetate, barium acetate, sodium benzoate, potassium benzoate, rubidium benzoate, cesium benzoate, magnesium benzoate, calcium benzoate, strontium benzoate, barium benzoate, sodium phthalate, potassium phthalate, calcium phthalate, magnesium phthalate, barium phthalate, calcium terephthalate and barium terephthalate. These can be used alone or in combination of two or more.

These compounds can be added to the reaction system for producing an aromatic polyester, at once or in portions as they are or by dissolving or dispersing in, for example, ethylene glycol.

When they are used by dispersing in a glycol, their particle diameters are preferably 5 μm or less, more preferably 3 μm or less. The timing of addition can be at any stage of polyester production as long as they can be in a good dispersion state in the aromatic polyester. These compounds may be added to an aromatic polyester in which a quaternary phosphonium sulfonate has been copolymerized; alternatively, the compounds may be added to an aromatic polyester in which no quaternary phosphonium sulfonate has been copolymerized, and the mixture is mixed, before film formation, with an aromatic polyester in which a quaternary phosphonium sulfonate has been copolymerized, so that the proportion of quaternary phoshonium sulfonate copolymerized, in aromatic polyester to be used for film formation and the amount of alkali metal or alkaline earth metal compound added become respective desired levels.

The amount of alkali metal or alkaline earth metal compound is preferably 0.1–20 mmol %, more preferably 0.2–18 mmol %, based on the bifunctional carboxylic acid component (excluding the sulfonate) constituting the aromatic polyester.

The combined use of the alkali metal or alkaline earth metal compound and the quaternary phosphonium sulfonate increases the thermal stability of the polyester and enables film production at a higher efficiency, although the reasons are not made clear. When the amount of the compound added is less than 0.1 mmol %, the advantage of the addition is not certain. When the amount is more than 20 mmol %, the effect of thermal stability increase in resulting polyester is saturated and is not higher than the effect when the addition amount is 20 mmol %. Between the proportion of quaternary phosphonium sulfonate copolymerized and the amount of alkali metal or alkaline earth metal compound added, there seems to exist no particular amount ratio at which a particularly large effect is obtained. However, when the proportion of quaternary phosphonium sulfonate copolymerized is 0.1–45 mmol % and the amount of alkali metal or alkaline earth metal compound added is more than 20 mmol %, the amounts of surface defects and black foreign matters (main component: antimony) in formed film are large.

In the present invention, the aromatic polyester preferably has a DC volume resistivity (P/D) of $0.5 \times 10^6$ to $2.0 \times 10^7$ Ω·cm as a molten film at 285° C.

In the present process using the aromatic polyester containing an alkali metal or alkaline earth metal compound, the cooling drum is advantageously rotated at a circumferential speed of preferably at least 60 m/min., more preferably 60–200 m/min.

Regarding the above second process of the present invention, it should be understood that the description not made yet is the same as the corresponding description made above regarding the first process of the present invention.

It was further made clear by the present invention that the objects of the present invention can thirdly be achieved by using, as an aromatic polyester, an aromatic polyester which contains in the polymer in a dispersed state 0.1–45 mmol %, based on the bifunctional carboxylic acid component, of a quaternary phosphonium sulfonate having no ester-forming functional group and which has an AC volume resistivity (F/D) of $6.5 \times 10^8$ Ω·cm or less as a molten film.

As the quaternary phosphonium sulfonate having no ester-forming functional group, there are preferably used, for example, compounds represented by the following general formula

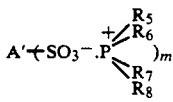

wherein A' is an aliphatic or aromatic group of 4–18 carbon atoms having a valency of m, $R_5$, $R_6$, $R_7$ and $R_8$ are independently a monovalent hydrocarbon group of 1–18 carbon atoms; and m is 1 or 2.

In the above formula, A' is an aliphatic or aromatic group of 4–18 carbon atoms having a valency of m, $R_5$, $R_6$, $R_7$ and $R_8$ are independently a monovalent hydrocarbon group of 1–18 carbon atoms; and m is 1 or 2.

Of the compounds represented by the above formula, those compounds of m=1 are disclosed in Japanese Patent Publication No. 29500/1989. As the compounds represented by the above formula, there can be mentioned, for example, the following compounds: aliphatic sulfonates such as butylsulfonate, octylsulfonate, laurylsulfonate, myristylsulfonate, hexadecylsulfonate, 2-ethylhexylsulfonate and the like, and their mixtures; substituted phenyl sulfonates such as p-tosylate, butylphenylsulfonate, dodecylphenylsulfonate, octadecylphenylsulfonate, dibutylphenylsulfonate and the like; and substituted or unsubstituted naphthyl sulfonates such as naphthylsulfonate, diisopropylnaphthylsulfonate, dibutylnaphthylsulfonate and the like. As the compounds of m=2, there can be mentioned, for example, 1,1-ethanedisulfonic acid, 1,2-ethanedisulfonic acid, phenol-2,4-disulfonic acid, phenol-2,5-disulfonic acid, 1,2-dioxybenzene-3,5-disulfonic acid, hydroxy-2,5-disulfonic acid, 1,4-benzenedisulfonic acid, 2,5-dimethyl-1,3-benzenedisulfonic acid, 4-methyl-1,3-benzenedisulfonic acid, 5-methyl-1,3-benzenedisulfonic acid, 5-methyloxycarbonyl-1,3-benzenedisulfonic acid, 1,8-dihydroxyanthraquinone-2,7-disulfonic acid, 1,5-dihydroxyanthraquinone-2,6-disulfonic acid and 1,4-dimethoxyanthraquinone-2,6-disulfonic acid. As specific examples of the above organic phoshonium cations, there can be mentioned aliphatic phosphoniums such as tetramethylphosphonium, tetraethylphosphonium, tetrabutylphosphonium, triethylmethylphosphonium, tributylmethylphosphonium, tributylmethylphosphonium, tributylethylphosphonium, trioctylmethylphosphonium, trimethylbutylphosphonium, trimethyloctylphosphonium, trimethyllaurylphosphonium, trimethylstearylphoshonium, triethyloctylphosphonium, tributyloctylphosphonium and the like; and aromatic phosphoniums such as triphenylmethylphosphonium, triphenylethylphosphonium, triethylbenzylphosphonium, tributylbenzylphosphonium and the like. Further, there can be used substituted phosphoniums such as tetramethylolphosphonium, tri(2-cyanoethyl)methylphosphonium, tri(2-cyanoethyl)ethylphosphonium, tri(2-cyanoethyl)benzylphosphonium, tri(3-hydroxypropyl)methylphosphonium, tri(3-hydroxypropyl)benzylphosphonium, trimethyl(2-hydroxyethyl)phosphonium, tributyl(2-hydroxyethyl)phosphonium and the like.

The quaternary phosphonium sulfonates represented by the above formula are shown as combinations of the above sulfonates and the above organic phosphonium cations. These quaternary phosphonium sulfonates, unlike the quaternary phosphonium sulfonates used in the first and second inventions, are characterized by having no ester-forming functional group. Therefore, the above quaternary phosphonium sulfonates are dispersed in the aromatic polyester aimed at by the present invention, without being copolymerized therein.

Thus, according to the present invention there is thirdly provided a process for producing a film of an aromatic polyester by extruding a molten film of a thermoplastic aromatic polyester onto a rotating cooling drum and allowing said film to adhere onto said rotating cooling drum to cool the molten film, which process is characterized in that there is used, as said aromatic polyester, an aromatic polyester using the above-mentioned quaternary phosphonium sulfonate having no ester-forming functional group, and electric charges are applied onto the surface of the molten film of the aromatic polyester in a non-contact state in the vicinity of the rotating cooling drum before the molten film reaches the surface of the drum.

The aromatic polyester aimed at by the present invention contains a quaternary phosphonium sulfonate in an amount of 0.1–45 mmol %, preferably 0.2–20 mmol %, based on the bifunctional carboxylic acid component constituting the aromatic polyester. Further, the aromatic polyester has an AC volume resistivity (F/D) of $6.5 \times 10^8$ Ω·cm or less, preferably $3.2 \times 10^8$ to $5.6 \times 10^6$ Ω·cm.

Regarding the third process of the present invention, it should be understood that the description not made yet is the same as the corresponding description made above regarding the first process of the present invention.

In the third process of the present invention, the quaternary phosphonium sulfonate can be added at any desired step up to the melt extrusion of aromatic polyester from extruder die, for example, at the polyester production step, the drying step or the pretreatment step before extrusion. However, the addition of quaternary phosphonium sulfonate in an amount more than 45 mmol % is not preferable because it increases the amount of foreign matters formed in film and, particularly in the third process, the compound adheres to the rotating cooling drum at the time of film formation, which tends to produce problems such as drum fouling at faster speed, increased drum cleaning, reduction in production efficiency and the like.

According to the above-mentioned first, second and third processes of the present invention, it is possible to allow a molten film of an aromatic polyester to adhere to a cooling drum even when the cooling drum is rotating at a relatively fast speed and thereby to produce a film of excellent quality while achieving a high productivity.

Thus, according to the present invention, there are provided aromatic polyester films having excellent quality, no surface defect, no foreign matters (main component: antimony) and a uniform thickness, produced by the first, second and third processes.

Of these, particularly the films produced by the first and second processes are characterized by being significantly different in electrical properties to AC, from the films produced from aromatic polyesters containing in the polymer chain a sodium sulfonate having ester-forming functional group(s).

Therefore, according to the present invention there is provided a film of an aromatic polyester, characterized in that said aromatic polyester (i) contains in the polymer chain a quaternary phosphonium sulfonate having ester-forming functional group(s), of a proportion of 0.1–45 mmol % based on the bifunctional carboxylic acid component constituting said aromatic polyester, or (i') contains in the polymer chain a quaternary phosphonium sulfonate having ester-forming functional group(s), of a proportion of 0.1–45 mmol % based on the bifunctional carboxylic acid component constituting said aromatic polyester, and further contains an alkali metal or alkaline earth metal compound of a proportion of 0.1–20 mmol % based on the bifunctional carboxylic acid component constituting said aromatic polyester; and (ii) shows, in the relationship of the AC volume resistivity and the DC volume resistivity as a molten film, a smaller AC volume resistivity than an aromatic polyester which contains in the polymer chain a sodium sulfonate having ester-forming functional group(s) and which has the same DC volume resistivity as the former polyester.

As the above film, there are preferred those films whose aromatic polyesters are composed mainly of ethylene terephthalate or ethylene-2,6-naphthalate. The above quaternary phosphonium sulfonate is represented, as mentioned above, by, for example, the following formula

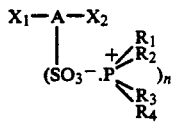

wherein $X_1$, $X_2$, A, $R_1$, $R_2$, $R_3$, $R_4$ and n have the same definitions as given above.

Regarding the above requirement (ii) for the film of the present invention, the present film advantageously has a small AC volume resistivity which is about ½ to 1/10, as compared with the comparative film having the same DC volume resistivity as the former film.

The aromatic polyester film of the present invention and the aromatic polyester film produced by the present process are suitably used in film fields such as magnetic tape application, electrical insulation application, condenser application, photography application, packaging application and the like.

The present invention is hereinafter described in more detail by way of Examples. In the Examples, parts refer to parts by weight; the intrinsic viscosity, melting point and electrostatic castability of polyester, the volume resistivities of polymer and film, the surface defect of film, etc. were measured and evaluated in accordance with the following methods.

1. Intrinsic viscosity

Measured at 35° C. using o-chlorophenol as a solvent.

Melting point of polymer

Measured at a temperature elevation rate of 10° C./min., using a differential scanning calorimeter (DSC).

3. Electrostatic castability

A polymer was melt-extruded in a film shape through an extruder die and the resulting film was casted on a rotating cooling drum while applying a voltage of 7,000 V between electrodes, which were, respectively, provided on the cooling drum and on the upper portion of the extruded film in the vicinity of the die. In this case, there was measured a maximum rotational speed of the cooling drum at which stable film formation was possible without producing any pinner bubble and without reducing uniformity of thickness. The electrostatic castability of the polymer can be ranked as follows depending upon the thus obtained maximum rotational speed of cooling drum.

Rank A: Stable film formation is possible at a rotational speed of casting drum, of 70 m/min. or more.

Rank B: Stable film formation is possible at a rotational speed of casting drum, of 60 m/min. to less than 70 m/min.

Rank C: Stable film formation is possible at a rotational speed of casting drum, of 55 m/min. to less than 60 m/min.

Rank D: Stable film formation is possible at a rotational speed of casting drum, of less than 55 m/min.

4. AC volume resistivity of polymer

An apparatus shown in FIG. 1 was used. A polymer (1) to be tested was placed in a container (3); a pair of electrodes (2) were inserted into the polymer (1); the container was immersed in a heating material (4) to heat and melt the polymer at a temperature higher than the melting point by 30° C.; the polymer was maintained at that temperature. A voltage of 100 V 50 Hz was applied to the electrodes (2) in the polymer, from an AC source (5) connected from outside. Calculation was made using the then obtained readings of an ammeter (6) and a voltmeter (7), the electrode area and the electrode-to-electrode distance, to obtain an AC volume resistivity of the polymer.

5. Surface defect of film

This was evaluated by examining the amount of particle-like foreign matters formed as a by-product in the step from production of thermoplastic polyester to its extrusion. A molten polymer was extruded at a temperature 35° C. higher than the melting point and then allowed to adhere onto a rotating cooling drum to cool the extruded polymer to obtain a substantially amorphous film. The film was then stretched by 3.6 times to a lengthwise direction and by 3.9 times to a crosswise direction to obtain a film of 15 μm in thickness.

The film was observed using a phase-contrast microscope and, using an image analyzer Luzex 500 manufactured by Nihon Regulator, there was counted the number of particles having a maximum length of 10 μm or more, present in the image of the microscope. When the number of said particles is 10/cm² or less, the film can be put into practical application.

6. Thermal stability of polymer

This was evaluated by in the measurement of surface defect of film in the above item 5, measuring the intrinsic viscosity of chip of thermoplastic polyester and the intrinsic viscosity of film after melt extrusion/cooling and calculating their difference.

When the difference was 0.052 or less, the thermal stability of the polymer was judged to be good and expressed by a mark ◯. When the difference was more than 0.052, the thermal stability of the polymer was judged to be poor and expressed by a mark X.

7. Measurement of volume resistivity of film

Figure 2:
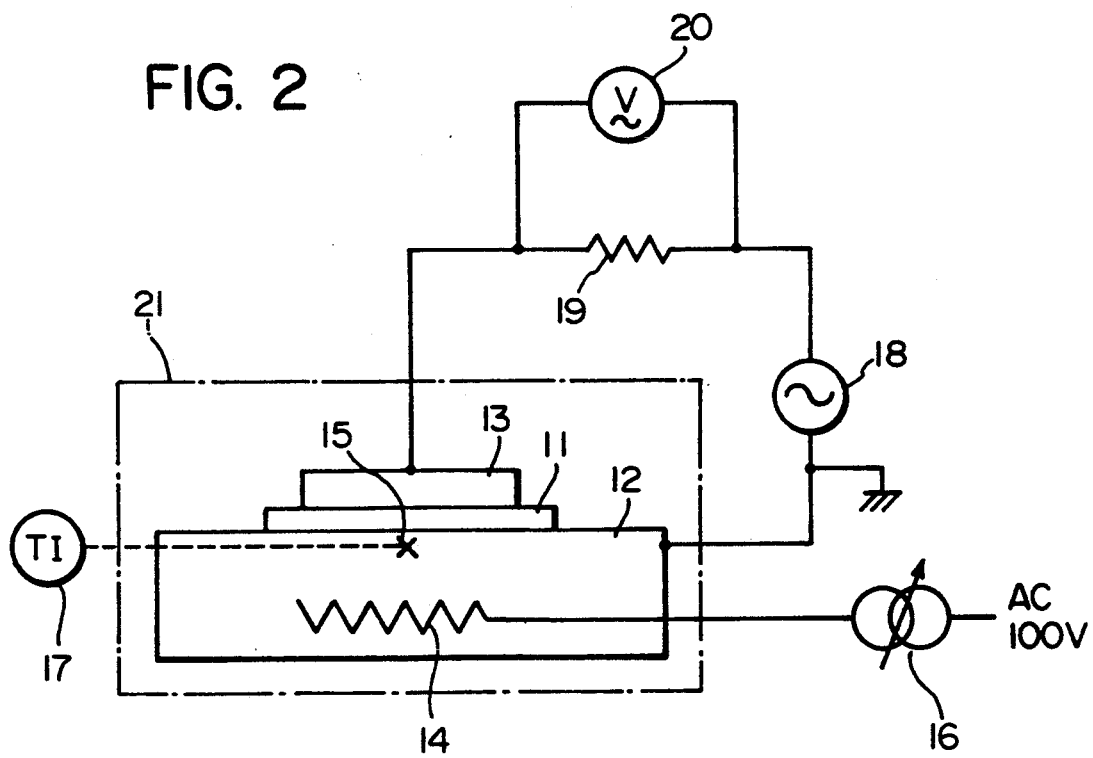
FIG. 2 shows an apparatus for measuring the volume resistivity of a film.

Measurement was made using an apparatus shown in FIG. 2. As a sample for measurement, a film of about 150 μm in thickness is used. An upper electrode 13 of 5.6 cm in diameter and 0.2 cm in thickness is arranged above the upper surface of a column-shaped lower electrode 12 of 20 cm in diameter so that a parallel space of 150 μm can be secured between the electrodes. The sample 11 for measurement is inserted between the electrodes so as to make tight contact with them.

The lower electrode accommodates inside an electrical heating unit 14 (driver by AC voltage source 16) and a temperature detection end 15 are accomodated inside lower electrode 12. They are constituted so that the variation of the surface temperature of the lower electrode becomes 1° C. or less at the measurement surface and the temperature difference between the measurement surface and the temperature detection and becomes 2° C. or less at a temperature elevation rate of 8° C./min. The temperature detection is made by a reading thermometer 17. The electrodes are placed in a heat insulation box 21.

An electric source 18 applies a generated voltage between the two electrodes via a reference resistance 19. The electric source generates a DC of 100 V when a DC volume resistivity of a film is measured and generates an AC of 100 V, 50 Hz when an AC volume resistivity of a film is measured. The electric current which flows through this circuit can be determined by reading the voltage generated between the two ends of the reference resistance 19, using an electron voltage meter 20 having an internal impedance of 100 Ω or more.

In the present invention, AC volume resistivity of the film when molten is measured using the above apparatus, when the lower electrode is subjected to temperature elevation at a rate of 8° C./min. and has reached a temperature 30° C. higher than the melting point of a test polymer, measured by DSC. The AC volume resistivity Z of the polymer is determined from the following formula using E (applied voltage), I (electric current), S (electrode area) and d (electrode-to-electrode distance).

$$Z = \frac{E}{I} \cdot \frac{S}{d}$$

EXAMPLE 1

0.038 part of manganese acetate tetrahydrate was added to a mixture of 100 parts of dimethyl terephthalate and 70 parts of ethylene glycol. The resulting mixture was subjected to an ester exchange reaction while it was heated slowly from 150° C. to 240° C. In the course of the reaction, when the reaction temperature reached 170° C., 0.040 part of antimony trioxide was added, and 0.2 part of spherical silica of 0.6 μm in average particle diameter was added further. Then, when the reaction temperature reached 220° C., there was added, in a solution form of 40° C., a mixture of 0.031 part of tetrabutylphosphonium 3,5-dicarboxybenzenesulfonate and 0.124 part of ethylene glycol. The ester exchange reaction was effected continuously. After the completion of the ester exchange reaction, there was added a solution (0.049 part in terms of trimethyl phosphate) obtained by heat-treating trimethyl phosphate in ethylene glycol at 135° C. for 5 hours at an applied pressure of 1.1–1.6 kg/cm². Thereafter, the reaction product was transferred to a polymerization reactor and heated to 290° C. to effect a polycondensation reaction under a high vacuum of 0.2 mmHg or less to obtain a polyester having an intrinsic viscosity of 0.60.

This polyester was melt extruded at 290° C. into a film shape of 210 μm in thickness. The resulting molten film was allowed to adhere onto the mirror surface of a cooling drum, by an electrostatic casting method using a linear electrode and was solidified. In this case, the rotational speed of the cooling drum was gradually increased, and the maximum casting speed was 97 m/min. at which a cooled film could be produced stably without giving rise to pinner bubbles of film, etc. caused by poor adhesion. This polyester film had, at 285° C. (30° C. higher than the melting point), an AC volume resistivity (F/D) of $6.3 \times 10^8$ Ω·cm and a DC volume resistivity (F/A) of $4.0 \times 10^8$ Ω·cm.

Subsequently, the cooled film (unstretched film) was biaxially stretched by 3.6 times to a lengthwise direction and by 3.9 times to a crosswise direction in this order, and subjected to a heat-setting treatment at 230° C. to obtain a biaxially stretched film. The film was examined for foreign matters, which gave, on average, 1 foreign matter of 10–20 μm in size, per cm² and substantially no foreign matter of 20 μm or more. The results are shown in Table 1.

EXAMPLES 2-5

Casting was effected in the same manner as in Example 1 except that calcium carbonate of 0.6 μm in average particle diameter was used in place of the spherical silica, the amount of tetrabutylphosphonium 3,5-dicarboxybenzenesulfonate added was changed as shown in Table 1, and the film thickness at casting was changed to 150 μm. The results are shown in Table 1.

COMPARATIVE EXAMPLES 1-4

Casting was effected in the same manner as in Example 2 except that in place of the tetrabutylphosphonium 3,5-dicarboxybenzenesulfonate there was used sodium acetate trihydrate or potassium acetate trihydrate in the amount shown in Table 1. The results are shown in Table 1.

Comparative Example 5

A biaxially stretched film of 15 μm in thickness was produced in the same manner as in Example 1 except that the amounts of tetrabutylphosphonium 3,5-dicarboxybenzenesulfonate and ethylene glycol added were increased to 0.344 part and 3 parts, respectively.

The foreign matters in the film were examined. As a result, there were confirmed, in the area of 100 cm$^2$, 2 black foreign matters of 60 $\mu$m or more, 5 foreign matters of 40–60 $\mu$m and 24 foreign matters of 20–40 $\mu$m. The compositions of the foreign matters were analyzed, which detected antimony, or antimony and phosphorus as main components.

The film had no commercial value as a base film of optical recording material and high density magnetic recording material.

EXAMPLE 6

0.018 part of manganese acetate tetrahydrate was added to a mixture of 100 parts of dimethyl 2,6-naphthalenedicarboxylate and 50 parts of ethylene glycol The resulting mixture was subjected to an ester exchange reaction while it was heated slowly from 150° C. to 240° C. In the course of the reaction, when the temperature of the reaction solution reached 210° C., there was added a mixture of 0.036 part of tetraphenylphosphonium 3,5-dicarboxybenzenesulfonate and 0.0838 part of ethylene glycol, after having been heated to 40° C. The ester exchange reaction was continued. After the completion of the ester exchange reaction, there were added 0.013 part of trimethyl phosphate and 0.2 part of truly spherical silica of 0.6 $\mu$m in average particle diameter In 5 minutes, 0.008 part by weight of titanium acetate was added. The reaction product was heated to 290° C. and a polycondensation reaction was effected under a high vacuum of 0.2 mmHg or less to produce a polyester having an intrinsic viscosity of 0.58.

Using this polyester, a biaxially stretched film was produced in the same manner as in Example 1 except that the temperature for heat-setting treatment was 305° C. The results are shown in Table 1.

EXAMPLE 7

0.038 part of manganese acetate tetrahydrate was added to a mixture of 100 parts of dimethyl terephthalate and 70 parts of ethylene glycol. The resulting mixture was subjected to an ester exchange reaction while it was slowly heated from 150° C. to 240° C. To the resulting reaction mixture were added 0.025 part of trimethyl phosphate and 0.2 part of spherical silica of 0.6 $\mu$m in average particle diameter. The mixture was reacted for 15 minutes. Then, 0.045 part of antimony trioxide was added. The mixture was reacted for 5 minutes, and 0.014 part of tetrabutylphosphonium dodecylsulfonate was added. Subsequently, the mixture was heated to 290° C. and a polycondensation reaction was effected under a high vacuum of 0.2 mmHg or less to obtain a polyester.

This polymer was casted in the same manner as in Example 1 to obtain a cooled film. The cooled film was biaxially stretched in order in the same manner as in Example 1 to produce a biaxially stretched film. The results are shown in Table 1.

EXAMPLE 8

The procedure of Example 1 was repeated except that 100 parts of the dimethyl terephthalate was changed to 88 parts of dimethyl terephthalate and 12 parts of dimethyl isophthalate and the amount of tetrabutylphosphonium 3,5-dicarboxybenzenesulfonate added was changed from 0.031 part to 0.017 part. The results are shown in Table 1.

EXAMPLE 9

The procedure of Example 4 was repeated except that 0.0015 part of potassium acetate was added after the addition of antimony trioxide. The results are shown in Table 1.

EXAMPLE 10

The polymer obtained under the conditions of Example 1 was melt extruded into a film shape of 210 $\mu$m in thickness. The film was allowed to adhere onto the surface of a cooling drum having a large number of channel-like cracks of 3 $\mu$m in groove width, by an electrostatic adhesion method.

EXAMPLE 11

The polymer obtained under the conditions of Example 2 was melt extruded into a film shape of 55 $\mu$m in thickness. The film was allowed to adhere onto the surface of a cooling drum having a water film of about 2 $\mu$m in thickness, using an electrostatic adhesion method in combination.

EXAMPLE 12

To 100 parts of bis-$\beta$-hydroxyethyl terephthalate and 65 parts of terephthalic acid were added to 29 parts of ethylene glycol and 0.3 part of tetrabutylphosphonium 3,5-dicarboxybenzenesulfonate. The mixture was subjected to an esterification reaction at 210°–230° C. The reaction was stopped when the distillation amount of water formed by the reaction became 13 parts. Thereto was added a solution (0.002 part in terms of trimethyl phosphate) which contains 0.027 part of antimony trixoide, 0.2 part of calcium carbonate (average diameter: 0.6 $\mu$m) and trimethyl phosphate in ethylene glycol per 100 parts of the reaction product, and was heat treated at 135° C. for 5 hours. The resulting mixture was transferred to a polymerization reactor and heated to 290° C. to effect a polycondensation reaction under a high vacuum of 0.2 mmHg or less to produce a polyester.

This polyester was casted in the same manner as in Example 1. The results are shown in Table 1.

EXAMPLE 13

0.016 part of a tetrabutylphosphonium dodecylbenzenesulfonate compound was mixed with a mixture of 50 parts of a poly(ethylene terephthalate) (containing a lubricant) of a chip form of 4 mm in particle diameter and 50 parts of a poly(ethylene terephthalate) (containing a lubricant) of flake form. The resulting mixture was melt mixed under vacuum venting and extruded into a film shape. The molten film was allowed to adhere onto a cooling drum and solidified, by an electrostatic adhesion method. In this case, there was seen no tendency that the rate of fouling of cooling drum was higher than that of the case of no phosphonium sulfonate compound addition. The results are shown in Table 1.

COMPARATIVE EXAMPLES 6–7

Casting was effected in the same manner as in Example 2 except that the tetrabutylphosphonium 3,5-dicarboxybenzenesulfonate was replaced by sodium 3,5-dicarboxybenzenesulfonate of the amount shown in Table 1. The results are shown in Table 1.

TABLE 1

| | Quaternary phosphonium salt | | | Alkali metal salt | | | Melting point °C. |
|---|---|---|---|---|---|---|---|
| | Type | Amount added part | Concentration mmole % | Type | Amount added part | Concentration mmole % | |
| Example | | | | | | | |
| 1 | Tetrabutylphosphonium 3,5-dicarboxybenzenesulfonate | 0.031 | 18 | Not used | — | — | 255 |
| 2 | Tetrabutylphosphonium 3,5-dicarboxybenzenesulfonate | 0.0009 | 0.5 | Not used | — | — | 256 |
| 3 | Tetrabutylphosphonium 3,5-dicarboxybenzenesulfonate | 0.0034 | 2 | Not used | — | — | 256 |
| 4 | Tetrabutylphosphonium 3,5-dicarboxybenzenesulfonate | 0.0021 | 12 | Not used | — | — | 255 |
| 5 | Tetrabutylphosphonium 3,5-dicarboxybenzenesulfonate | 0.006 | 35 | Not used | — | — | 255 |
| Comparative Example | | | | | | | |
| 1 | Not used | — | — | Sodium acetate trihydrate | | 12 | 256 |
| 2 | Not used | — | — | Sodium acetate trihydrate | | 30 | 256 |
| 3 | Not used | — | — | Potassium acetate trihydrate | | 12 | 256 |
| 4 | Not used | — | — | Potassium acetate trihydrate | | 30 | 256 |
| 5 | Tetrabutylphosphonium 3,5-dicarboxybenzenesulfonate | 0.344 | 200 | Not used | — | — | — |
| Example | | | | | | | |
| 6 | Tetrabutylphosphonium 3,5-dicarboxybenzenesulfonate | 0.036 | 15 | Not used | — | — | 267 |
| 7 | Tetrabutylphosphonium dodecylsulfonate | 0.014 | 6 | Not used | — | — | 256 |
| 8 | Tetrabutylphosphonium 3,5-dicarboxybenzenesulfonate | 0.017 | 10 | Not used | — | — | 229 |
| 9 | Tetrabutylphosphonium 3,5-dicarboxybenzenesulfonate | 0.021 | 12 | Potassium acetate trihydrate | 0.0015 | 3 | 255 |
| 10 | Tetrabutylphosphonium 3,5-dicarboxybenzenesulfonate | 0.031 | 18 | Not used | — | — | 255 |
| 11 | Tetrabutylphosphonium 3,5-dicarboxybenzenesulfonate | 0.009 | 0.5 | Not used | — | — | 256 |
| 12 | Tetrabutylphosphonium 3,5-dicarboxybenzenesulfonate | 0.031 | 12 | Not used | — | — | 256 |
| 13 | Tetrabutylphosphonium dodecylsulfonate | — | 20 | Not used | — | — | 256 |
| Comparative Example | | | | | | | |
| 6 | Not used | — | — | Sodium 3,5-dicarboxybenzenesulfonate | 0.017 | 12 | 256 |
| 7 | Not used | — | — | Sodium 3,5-dicarboxybenzenesulfonate | 0.041 | 30 | 256 |

| | AC volume resistivity of film ($\Omega \cdot cm$) | DC volume resistivity of film ($\Omega \cdot cm$) | Maximum casting speed m/min. | Others |
|---|---|---|---|---|
| Example | | | | |
| 1 | $6.3 \times 10^6$ | $4.0 \times 10^8$ | 97 | Number of foreign matters (at 100 cm$^2$) 20 μm ≦:0  *1 Lubricant added |
| 2 | $1.3 \times 10^8$ | $2.0 \times 10^9$ | 61 | |
| 3 | $4.0 \times 10^7$ | $1.6 \times 10^9$ | 80 | |
| 4 | $1.0 \times 10^7$ | $1.0 \times 10^9$ | 91 | |
| 5 | $4.0 \times 10^6$ | $4.0 \times 10^8$ | 108 | |
| Comparative Example | | | | |
| 1 | $2.5 \times 10^8$ | $2.0 \times 10^9$ | 50 | |
| 2 | $1.3 \times 10^8$ | $1.0 \times 10^9$ | 62 | |
| 3 | $1.0 \times 10^8$ | $1.3 \times 10^9$ | 62 | |
| 4 | $6.3 \times 10^7$ | $6.3 \times 10^8$ | 65 | |
| 5 | — | — | — | *2 Lubricant added, P—K$_2$ amount Number of foreign matters (at 100 cm$^2$) 60 μm ≦:2  40–60 μm:5  20–40 μm:24 |
| Example | | | | |
| 6 | $3.2 \times 10^8$ | $3.2 \times 10^8$ | 90 | *1 Lubricant added |
| 7 | $1.3 \times 10^7$ | $1.0 \times 10^9$ | 90 | Number of foreign matters (at 100 cm$^2$) 20 μm ≦:0 |
| 8 | $3.2 \times 10^7$ | $1.6 \times 10^9$ | 81 | IA: 12 mol % |
| 9 | $7.9 \times 10^6$ | $7.9 \times 10^8$ | 95 | |

TABLE 1-continued

| | | | | |
|---|---|---|---|---|
| 10 | $6.3 \times 10^8$ | $4.0 \times 10^8$ | 140 | Same polymer as in Example 1 |
| 11 | $1.3 \times 10^8$ | $2.0 \times 10^9$ | 66 | Same polymer as in Example 2 Sheet thickness: 55μ |
| 12 | $1.0 \times 10^7$ | $1.6 \times 10^9$ | 90 | |
| 13 | $1.0 \times 10^7$ | $7.9 \times 10^8$ | 100 | No change in fouling rate of cooling drum |
| Comparative Example | | | | |
| 6 | $3.2 \times 10^8$ | $1.8 \times 10^9$ | 52 | |
| 7 | $1.4 \times 10^8$ | $9.4 \times 10^8$ | 57 | |

EXAMPLE 14

0.038 part of manganese acetate tetrahydrate was added to a mixture of 100 parts of dimethyl terephthalate and 70 parts of ethylene glycol. The resulting mixture was subjected to an ester exchange reaction while it was heated slowly from 150° C. to 240° C. In the course of the reaction, when the reaction temperature reached 220° C., there was added, in a solution form of 40° C., a mixture of 0.0309 part of tetrabutylphosphonium 3,5-dicarboxybenzenesulfonate and 0.124 part of ethylene glycol. The ester exchange reaction was continued. After the completion of the ester exchange reaction, 0.025 part of trimethyl phosphate was added, and a reaction was effected for 10 minutes. 0.045 part of antimony trioxide was added. The mixture was reacted for minutes and then 0.00152 part of potassium acetate was added. The reaction product was transferred to a polymerization reactor and heated to 290° C. to effect a polycondensation reaction under a high vacuum of 0.2 mmHg or less to obtain a polyester (A) having an intrinsic viscosity of 0.60.

The polyester (A) was melt extruded at 290° C., allowed to cool on the surface of a cooling drum (circumferential speed at drum surface: 70 m/min.) by an electrostatic casting method, and stretched by 3.6 times to a lengthwise direction and by 3.9 times to a crosswise direction to obtain a biaxially stretched film of 15 μm in thickness.

The results are shown in Table 2.

Although the reason is not certain, clear polymers containing no inorganic or organic lubricant generally tend to cause pinner bubbles, as compared with polymers containing a lubricant. Moreover, in these clear polymers, very fine bubbles remain even after stretching step while in polymers containing at least 0.1 % by weight of a lubricant, said very fine bubbles disappear in the stretching step. Therefore, the maximum casting speed of clear polymer is 10–30 % lower in many cases.

EXAMPLE 15

To 100 parts of bis-β-hydroxyethyl terephthalate and 65 parts of terephthalic acid were added 29 parts of ethylene glycol and 0.314 part of tetrabutylphosphonium 3,5-dicarboxybenzenesulfonate. The mixture was subjected to an ester exchange reaction at 210°–230° C. When the distillation amount of water formed by the reaction became 13 parts, the reaction was stopped and there were added 0.027 part of antimony trioxide and 0.002 part of trimethyl phosphate, per 100 parts of the reaction product. The reaction product was transferred to a polymerization reactor and heated to 290° C. to effect a polycondensation reaction under a high vacuum of 0.2 mmHg or less to obtain a polyester (B) having an intrinsic viscosity of 0.62.

Separately, a polyester (C) was obtained in the same manner as in the production of the polyester (B) except that no tetrabutylphosphonium 3,5-dicarboxybenzenesulfonate (0.314 part) was added and 0.1255 part of magnesium benzoate was added.

Also, a polyester (D) was obtained in the same manner as in the production of the polyester (C) except that no magnesium benzoate (0.1255 part) was added.

The polyesters (B), (C) and (D) were mixed to prepare a polyester (F) so that the amounts of tetrabutylphosphonium 3,5-dicarboxybenzenesulfonate copolymerized and magnesium benzoate in the polyester (F) became the levels as shown in Table 1.

Using the polyester (F), a film was produced in the same manner as in Example 14. The results are shown in Table 2.

EXAMPLE 16

A polyester (G) having an intrinsic viscosity of 0.60 was obtained in the same manner as in Example 14 except that the amount of tetrabutylphosphonium 3,5-dicarboxybenzenesulfonate was changed from 0.0309 part to 0.0035 part and 0.00152 part of the potassium acetate was changed to 0.000068 part of lithium acetate.

Using this polyester, a film was produced in the same manner as in Example 14 except that the circumferential speed of drum was changed to 60 m/min. The results are shown in Table 2.

EXAMPLE 17

0.038 part of manganese acetate tetrahydrate was added to a mixture of 100 parts of dimethyl terephthalate and 70 parts of ethylene glycol. The mixture was subjected to an ester exchange reaction while it was heated slowly from 150° C. to 240° C. In the course of the reaction, when the temperature of the reaction mixture reached 210° C., there was added a mixture of 0.858 part of tetrabutylphosphonium 3,5-dicarboxybenzenesulfonate and 3.432 parts of ethylene glycol. The ester exchange reaction was continued. After the completion of the ester exchange reaction, 0.025 part of trimethyl phosphate was added and a reaction was effected for 15 minutes. 0.045 part of antimony trioxide was added and the reaction was effected for a further 5 minutes. Then, the reaction product was transferred to a polymerization reactor and heated to 290 to effect a polycondensation reaction under a high vacuum of 0.2 mmHg or less to obtain a polyester (H) having an intrinsic viscosity of 0.60.

Separately, a polyester (I) having an intrinsic viscosity of 0.60 was obtained in the same manner as in the production of the polyester (H) except that when the reaction temperature reached 210° C., there was not added the mixture of tetrabutylphosphonium 3,5-dicarboxybenzenesulfonate and ethylene glycol.

Also, a polyester (J) having an intrinsic viscosity of 0.60 was obtained in the same manner as in the production of the polyester (I) except that in 10 minutes after the completion of the ester exchange reaction and the subsequent addition of given amounts of trimethyl phosphate and antimony trioxide, there was added 0.140 part of sodium acetate trihydrate.

The polyesters (H), (I) and (J) were mixed to prepare a polyester (K) so that the amounts of tetrabutylphosphonium 3,5-dicarboxybenzenesulfonate copolymerized and sodium acetate trihydrate in the polyester (K) became the levels as shown in Table 2.

Using the polyester (K), a film was produced in the same manner as in Example 16. The results are shown in Table 2.

EXAMPLE 18

0.018 part of manganese acetate tetrahydrate was added to a mixture of 100 parts of dimethyl 2,6-naphthalenedicarboxylate and 50 parts of ethylene glycol. The mixture was heated slowly from 150° C. to 240° C. to effect an ester exchange reaction. In the course of the reaction, when the temperature of the reaction solution reached 210° C., there was added, in a solution form of 40° C., a mixture of 0.0359 part of tetraphenylphosphonium 3,5-dicarboxybenzenesulfonate, 0.00020 part of potassium acetate and 0.0838 part of ethylene glycol. The ester exchange reaction was continued. After the completion of the ester exchange reaction, 0.013 part of trimethyl phosphate was added. In 5 minutes, 0.008 part by weight of titanium acetate was added. The reaction product was heated to 290° C. to effect a polycondensation reaction under a high vacuum of 0.2 mmHg or less to obtain a polyester (P) having an intrinsic viscosity of 0.52.

Using this polyester (P), a film was produced in the same manner as in Example 14 except that the temperature for melt extrusion was changed to 305° C. The results are shown in Table 2.

COMPARATIVE EXAMPLE 8

A polyester (Q) having an intrinsic viscosity of 0.52 was obtained in the same manner as in Example 18 except that the tetraphenylphosphonium 3,5-dicarboxybenzenesulfonate (0.0359 part) and potassium acetate (0.00020 part) added when the reaction temperature reached 210° C., were changed to 0.0352 part of magnesium acetate tetrahydrate.

Using this polyester (Q), a film was produced in the same manner as in Example 18 except that the circumferential speed of drum was changed to 55 m/min. The results are shown in Table 2.

EXAMPLE 19

Polyesters (H), (I) and (J) were obtained in the same manner as in Example 17.

Separately, 0.038 part of manganese acetate tetrahydrate was added to a mixture of 100 parts of dimethyl terephthalate and 70 parts of ethylene glycol. The mixture was subjected to an ester exchange reaction while it was heated slowly from 150° C. to 240° C. To the resulting reaction product was added 0.025 part of trimethyl phosphate, and a reaction was effected for 15 minutes. Then, 0.045 part of antimony trioxide was added and the reaction was effected for a further 10 minutes. Thereafter, there was added a mixture of 1.0 part of calcium carbonate of 1.0 μm in average particle diameter and 5 parts of ethylene glycol. The resulting mixture was heated to 290° C. to effect a polycondensation reaction under a high vacuum of 0.2 mmHg or less to obtain a polyester (R) having an intrinsic viscosity of 0.60.

The thus obtained polyesters (H), (I), (J) and (R) were mixed to prepare a polyester (S) so that the amounts of tetrabutylphosphonium 3,5-dicarboxybenzenesulfonate and sodium acetate trihydrate in the polyester (S) became the levels shown in Table 2 and the content of calcium carbonate of 1.0 μm in average particle diameter became 0.10 part by weight per 100 parts by weight of polymer.

Using this polyester (S), a film was produced in the same manner as in Example 16. The results are shown in Table 2.

TABLE 2

| | Quaternary phosphonium sulphonate | | Compound of element of Group IA or IIA of periodic table | |
|---|---|---|---|---|
| | Type | Copolymer mmol % | Type | Amount added mmol % |
| Example | | | | |
| 14 | Tetrabutylphosphonium 3,5-dicarboxybenzenesulfonate | 18 | Potassium acetate | 3.0 |
| 15 | Tetrabutylphosphonium 3,5-dicarboxybenzenesulfonate | 12 | Magnesium benzoate | 0.6 |
| 16 | Tetrabutylphosphonium 3,5-dicarboxybenzenesulfonate | 2 | Lithium acetate | 0.2 |
| 17 | Tetrabutylphosphonium 3,5-dicarboxybenzenesulfonate | 5 | Sodium acetate trihydrate | 10.0 |
| 18 | Tetraphenylphosphonium 3,5-dicarboxybenzenesulfonate | 15 | Potassium acetate | 0.5 |
| Comparative Example | | | | |
| 8 | — | — | Magnesium acetate trihydrate | 40 |
| Example | | | | |
| 19 | Tetrabutylphosphonium 3,5-dicarboxybenzenesulfonate | 8 | Sodium acetate trihydrate | 0.12 |

| AC volume resistivity of polymer at 285° C. Ω·cm | AC volume resistivity of film Ω·cm | Surface defect of film number/cm² | Thermal stability | Maximum casting speed m/min. |
|---|---|---|---|---|

TABLE 2-continued

| Example | | | | | |
|---|---|---|---|---|---|
| 14 | $3.8 \times 10^6$ | $6.5 \times 10^6$ | 1 | O | 78 |
| 15 | $5.0 \times 10^6$ | $1.0 \times 10^7$ | 1 | O | 72 |
| 16 | $1.4 \times 10^7$ | $3.8 \times 10^7$ | 0 | O | 65 |
| 17 | $8.0 \times 10^6$ | $1.8 \times 10^7$ | 8 | O | 69 |
| 18 | $4.1 \times 10^6$ | $8.0 \times 10^6$ | 1 | O | 75 |
| Comparative Example | | | | | |
| 8 | $9.5 \times 10^7$ | — | 80 | X | — |
| Example | | | | | |
| 19 | $6.5 \times 10^6$ | $1.1 \times 10^7$ | 5 | O | 69 |

We claim:

1. A process for producing a film of an aromatic polyester, which comprises extruding a molten film of a thermoplastic aromatic polyester having a bifunctional carboxylic acid component onto a surface of a rotating cooling drum, said molten film having a surface, and allowing said film to adhere onto said rotating cooling drum to cool the molten film, wherein said aromatic polyester is an aromatic polyester which contains in the polymer chain 0.1–45 mmol %, based on the bifunctional carboxylic acid component, of a quaternary phosphonium sulfonate having ester-forming functional group(s) and which has an AC volume resistivity of $6.5 \times 10^8$ $\Omega$·cm or less as a molten film, and electric charges are applied onto the surface of the molten film of the aromatic polyester in a non-contact state vicinal to the rotating cooling drum right before the molten film reaches the surface of the drum.

2. A process according to claim 1, wherein the the rotating cooling drum has a circumferential speed of at least 50 m/min.

3. A process according to claim 1, wherein the the rotating cooling drum has a circumferential speed of 60–200 m/min.

4. A process according to claim 1, wherein the rotating cooling drum has a number of channel-like microcracks on the surface of the drum.

5. A process according to claim 4, wherein the rotating cooling drum has a circumferential speed of 80–200 m/min.

6. A process according to claim 1, wherein the surface of the rotating cooling drum is a mirror surface.

7. A process according to claim 1, wherein the rotating cooling drum has a circumferential speed of 60–150 m/min.

8. A process according to claim 1, wherein a liquid film composed mainly of water is provided on the surface of the rotating cooling drum.

9. A process according to claim 1, wherein the quaternary phosphonium sulfonate having ester-forming functional group(s) is represented by the following formula $$\begin{array}{c} X^1-A-X^2 \\ | \\ (SO_3^-\cdot P \underset{R^4}{\overset{R^1}{\underset{R^3}{\overset{+}{\diagup}}}} R^2)_n \end{array}$$

wherein A is an aliphatic group or an aromatic group of 2–18 carbon atoms having a valency of n+2; $X_1$ and $X_2$ are the same or different and each a hydrogen atom or an ester-forming functional group; n is 1 or 2; $R_1$, $R_2$, $R_3$, and $R_4$ are the same or different and each is an alkyl group of 1–18 carbon atoms, a benzyl group or an aryl group of 6–12 carbon atoms; however, $X_1$ and $X_2$ are not hydrogen simultaneously.

10. A process for producing a film of an aromatic polyester, which comprises extruding a molten film of a thermoplastic aromatic polyester having a bifunctional carboxylic acid component onto a surface of a rotating cooling drum, said molten film having a surface, and allowing said film to adhere onto said rotating cooling drum to cool the molten film, wherein said aromatic polyester is an aromatic polyester which contains in the polymer chain 0.1–45 mmol %, based on the bifunctional carboxylic acid component, of a quaternary phosphonium sulfonate having ester-forming functional group(s), and further contains 0.1–20 mmol %, based on the bifunctional carboxylic acid component, of an alkali metal or alkaline earth metal compound, and which has an AC volume resistivity of $6.5 \times 10^8$ $\Omega$·cm or less as a molten film, and electric charges are applied onto the surface of the molten film of the aromatic polyester in a non-contact state right after the molten film reaches the surface of the rotating cooling drum.

11. A process according to claim 10, wherein the rotating cooling drum has a circumferential speed of at least 60 m/min.

12. A process according to claim 10, wherein the rotating cooling drum has a circumferential speed of 60–200 m/min.

13. A process according to claim 10, wherein the aromatic polyester has an AC volume resistivity of $0.5 \times 10^6$ to $2.0 \times 10^7$ $\Omega$·cm as a molten film.

14. A process for producing a film of an aromatic polyester, which comprises extruding a molten film of a thermoplastic aromatic polyester having a bifunctional carboxylic acid component onto a surface of a rotating cooling drum, said molten film having a surface, and allowing said film to adhere onto said rotating cooling drum to cool the molten film, wherein said aromatic polyester is an aromatic polyester which contains in the polymer in a dispersed state 0.1–45 mmol %, based on the bifunctional carboxylic acid component, of a quaternary phosphonium sulfonate having no ester-forming functional group and which has an AC volume resistivity of $6.5 \times 10^8$ $\Omega$·cm or less as a molten film, and electric charges are applied onto the surface of the molten film of the aromatic polyester in a non-contact state vicinal to of the rotating cooling drum before the molten film reaches the surface of the drum.

15. A process according to claim 14, wherein the quaternary phosphonium sulfonate having no ester-forming functional group is represented by the following formula

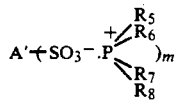

wherein A' is an aliphatic group or an aromatic group of 4–18 carbon atoms having a valency of m, $R_5$, $R_6$ $R_7$ and $R_8$ are independently a monovalent hydrocarbon group of 1–18 carbon atoms; and m is 1 or 2.

16. A film of a thermoplastic aromatic polyester having a bifunctional carboxylic acid component, wherein said aromatic polyester
   (i) contains in the polymer chain a quaternary phosphonium sulfonate having ester-forming functional group(s), in a proportion of 0.1–45 mmol % based on the bifunctional carboxylic acid component, and
   (ii) as a molten film, shows a smaller AC volume resistivity than an aromatic polyester which contains in the polymer chain a sodium sulfonate having ester-forming functional group(s) and which has the same DC volume resistivity as the former polyester.

17. A film according to claim 16, wherein the aromatic polyester is composed mainly of ethylene terephthalate.

18. A film according to claim 16, wherein the aromatic polyester is composed mainly of ethylene 2,6-naphthalate.

19. A process according to claim 16, wherein the quaternary phosphonium sulfonate having ester-forming functional group(s) is represented by the following formula

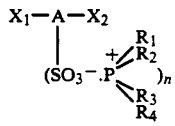

wherein A is an aliphatic group or an aromatic group of 2–18 carbon atoms having a valency of n+2; $X_1$ and $X_2$ are the same or different and each is a hydrogen atom or an ester-forming functional group; n is 1 or 2; $R_1$, $R_2$, $R_3$, and $R_4$ are the same or different and each is an alkyl group of 1–18 carbon atoms, a benzyl group or an aryl group of 6–12 carbon atoms; however, $X_1$ and $X_2$ are not hydrogen simultaneously.

20. A film of a thermoplastic aromatic polyester having a bifunctional carboxylic acid component, wherein said aromatic polyester
   (i) contains in the polymer chain a quaternary phosphonium sulfonate having ester-forming functional group(s), in a proportion of 0.1–45 mmol % based on the bifunctional carboxylic acid component,
   (ii) contains an alkali metal or alkaline earth metal compound in a proportion of 0.1–20 mmol % based on the bifunctional carboxylic acid component, and
   (iii) as a molten film, shows a smaller AC volume resistivity than an aromatic polyester which contains in the polymer chain a sodium sulfonate having ester-forming functional group(s) and which has the same DC volume resistivity as the former polyester.

21. A film produced by the process according to claim 14.

* * * * *